US008892822B2

(12) United States Patent
Chou

(10) Patent No.: US 8,892,822 B2
(45) Date of Patent: Nov. 18, 2014

(54) SELECTIVELY DROPPING PREFETCH REQUESTS BASED ON PREFETCH ACCURACY INFORMATION

(75) Inventor: Yuan C. Chou, Los Gatos, CA (US)

(73) Assignee: Oracle International Corporation, Redwood Shores, CA (US)

(*) Notice: Subject to any disclaimer, the term of this patent is extended or adjusted under 35 U.S.C. 154(b) by 283 days.

(21) Appl. No.: 13/306,800

(22) Filed: Nov. 29, 2011

(65) Prior Publication Data

US 2013/0138887 A1    May 30, 2013

(51) Int. Cl.
*G06F 12/08*    (2006.01)
*G06F 9/38*    (2006.01)

(52) U.S. Cl.
CPC ............ *G06F 12/0862* (2013.01); *G06F 9/383* (2013.01)
USPC .................... 711/137; 711/122; 711/E12.057

(58) Field of Classification Search
CPC .... G06F 12/0862; G06F 9/3832; G06F 9/383
USPC .................. 711/122, 137, E12.057, E12.004, 711/E12.026; 712/207
See application file for complete search history.

(56) References Cited

U.S. PATENT DOCUMENTS

| | | | | |
|---|---|---|---|---|
| 5,848,254 A | * | 12/1998 | Hagersten | 712/207 |
| 6,401,194 B1 | * | 6/2002 | Nguyen et al. | 712/210 |
| 6,412,046 B1 | * | 6/2002 | Sharma et al. | 711/137 |
| 7,260,704 B2 | * | 8/2007 | Cooksey et al. | 711/137 |
| 7,383,391 B2 | * | 6/2008 | Davis et al. | 711/137 |
| 7,707,359 B2 | * | 4/2010 | Mesard et al. | 711/137 |
| 8,176,141 B1 | * | 5/2012 | Lambert et al. | 709/212 |
| 8,230,177 B2 | * | 7/2012 | Luttrell | 711/137 |
| 8,443,151 B2 | * | 5/2013 | Tang et al. | 711/137 |
| 8,762,649 B2 | * | 6/2014 | Hooker et al. | 711/137 |

OTHER PUBLICATIONS

NN9712129, "M-Way Set Associative Prefetch/Stream Buffer Design", IBM Technical Disclosure, vol. 40, Issue 12, pp. 129-132, Dec. 1997.*
Vellanki et al., "A Cost-Benefit Scheme for High Performance Predictive Prefetching", SC '99, ACM, 1999, pp. 1-18.*

* cited by examiner

*Primary Examiner* — Pierre-Michel Bataille
(74) *Attorney, Agent, or Firm* — Park, Vaughan, Fleming & Dowler LLP

(57) ABSTRACT

The disclosed embodiments relate to a system that selectively drops a prefetch request at a cache. During operation, the system receives the prefetch request at the cache. Next, the system identifies a prefetch source for the prefetch request, and then uses accuracy information for the identified prefetch source to determine whether to drop the prefetch request. In some embodiments, the accuracy information includes accuracy information for different prefetch sources. In this case, determining whether to drop the prefetch request involves first identifying a prefetch source for the prefetch request, and then using accuracy information for the identified prefetch source to determine whether to drop the prefetch request.

18 Claims, 5 Drawing Sheets

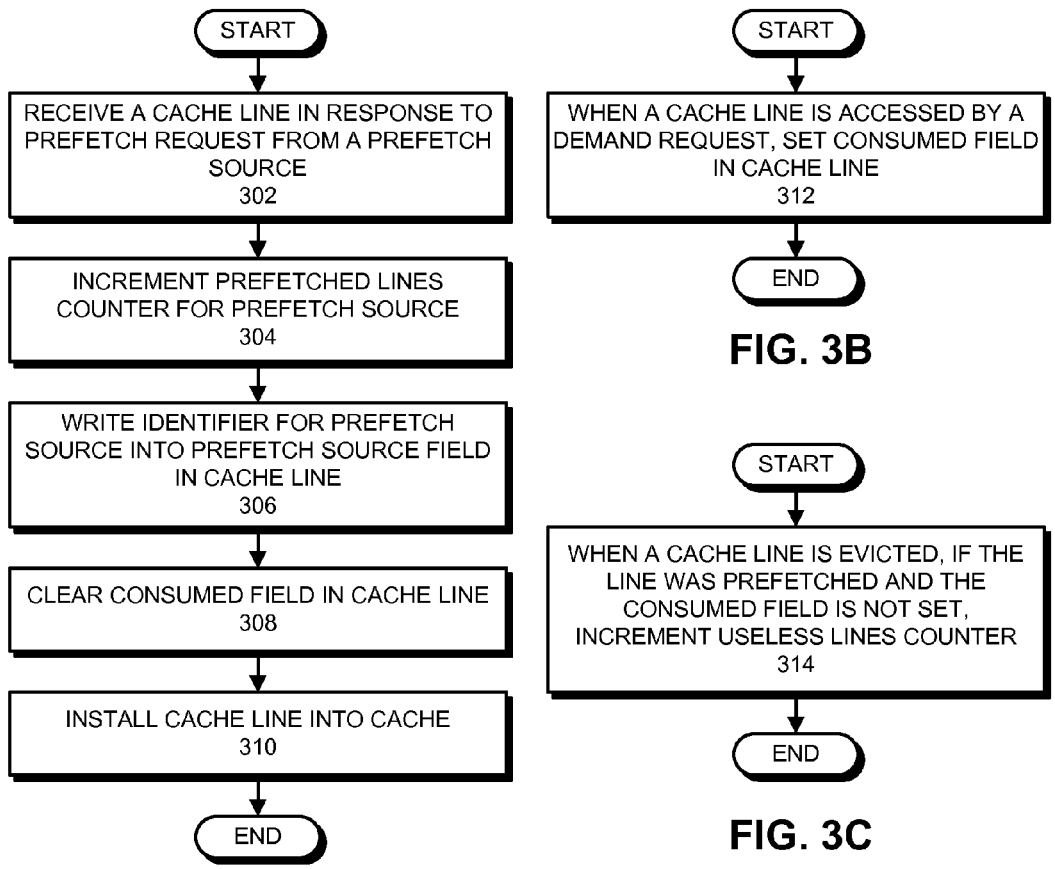

SELECTIVELY DROPPING PREFETCH REQUESTS BASED ON PREFETCH ACCURACY INFORMATION

BACKGROUND

1. Field

The disclosed embodiments relate to techniques for improving the performance of computer systems. More specifically, the disclosed embodiments relate to a method and apparatus for using prefetch accuracy information to make decisions about handling prefetches received during program execution.

2. Related Art

Prefetching can significantly improve computer system processor performance by loading cache lines containing instructions or data into a cache memory before the instructions or data are needed. This can prevent the processor from stalling while waiting for the instructions or data. However, prefetches can actually degrade processor performance if they are inaccurate because inaccurate prefetches consume valuable memory bandwidth and also cause cache pollution, both of which can delay actual demand requests.

Some processors attempt to mitigate the problem of prefetches delaying demand requests by implementing a "prefetch-dropping" mechanism. For example, some systems drop prefetch requests directed to a cache if the occupancy of the cache's miss buffer reaches a prescribed threshold. Unfortunately, empirical results show that this type of prefetch-dropping often does not perform well in practice. In fact, system performance can actually be reduced in some cases when prefetch dropping is enabled.

Hence, what is needed is a method and an apparatus for implementing prefetch dropping without the above-described problems.

SUMMARY

The disclosed embodiments relate to a system that selectively drops a prefetch request at a cache. During operation, the system receives the prefetch request at the cache. Next, the system uses accuracy information for previous prefetch requests associated with the cache to determine whether to drop the prefetch request at the cache.

In some embodiments, the accuracy information includes accuracy information for different prefetch sources. In these embodiments, determining whether to drop the prefetch request involves first identifying a prefetch source for the prefetch request, and then using accuracy information for the identified prefetch source to determine whether to drop the prefetch request.

In some embodiments, if accuracy information for a given prefetch source drops below a minimum value, the system temporarily disables the given prefetch source which, for example, can involve turning off the prefetch source.

In some embodiments, the different prefetch sources can include: (1) a software prefetcher that generates software prefetch instructions; (2) a stride-based hardware prefetcher that generates prefetches by inferring strides for an associated data stream; and (2) a next-line hardware prefetcher that generates prefetches for consecutive cache lines.

In some embodiments, the different prefetch sources can be associated with different levels of cache memory.

In some embodiments, while determining whether to drop the prefetch request, the system first determines an occupancy for a miss buffer associated with the cache. Next, the system determines that the prefetch request should be dropped if the determined occupancy exceeds an occupancy threshold, wherein the occupancy threshold was calculated based on the measured accuracy information.

In some embodiments, different occupancy thresholds can exist for different prefetch sources.

In some embodiments, prior to receiving the prefetch request, the system determines the accuracy information at a given cache by performing the following operations for each prefetch source. The system first measures a number of prefetched lines which were prefetched into the given cache for the prefetch source. The system also measures a number of useless lines, which were prefetched into the given cache for the prefetch source, but were not accessed by a demand request prior to being evicted from the given cache. Finally, the system determines an accuracy value for the prefetch source, wherein the accuracy value is based on a ratio between the number of useless lines and the number of prefetched lines.

In some embodiments, after determining the accuracy information, the system communicates the determined accuracy information to other caches which are associated with the given cache.

In some embodiments, each cache line can include: a source field indicating whether the cache line is associated with a prefetch and identifying an associated prefetch source; a consumed field indicating whether the cache line has been accessed by a demand request; and a strand field identifying the strand that generated the prefetch for the cache line.

In some embodiments, a given cache includes: (1) a prefetched lines counter for each prefetch source indicating a number of prefetched lines which were prefetched into the given cache for the prefetch source; and (2) a useless lines counter for each prefetch source indicating a number of useless lines, which were prefetched into the given cache for the prefetch source but were not accessed by a demand request prior to being evicted from the given cache.

BRIEF DESCRIPTION OF THE FIGURES

FIG. 3A presents a flow chart illustrating how a prefetched cache line is processed when it is received at a cache in accordance with the disclosed embodiments.

FIG. 3B presents a flow chart illustrating how the consumed field is set in a cache line in accordance with the disclosed embodiments.

FIG. 3C presents a flow chart illustrating what happens when a prefetched cache line is evicted in accordance with the disclosed embodiments.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One problem with existing prefetch-dropping mechanisms is that they do not distinguish between accurate and inaccurate prefetches. These mechanisms drop both types of prefetches using the same criteria. Ideally, accurate prefetches should not be easily dropped, while less accurate prefetches should be dropped more freely. The present invention solves this problem by measuring accuracy for different types of prefetches, and then applying a different prefetch-dropping criteria to each type of prefetch based on the measured accuracy information.

The details of this technique are described in detail below, but we first describe the structure of a computer system which uses this technique.

Computer System

Figure 1:
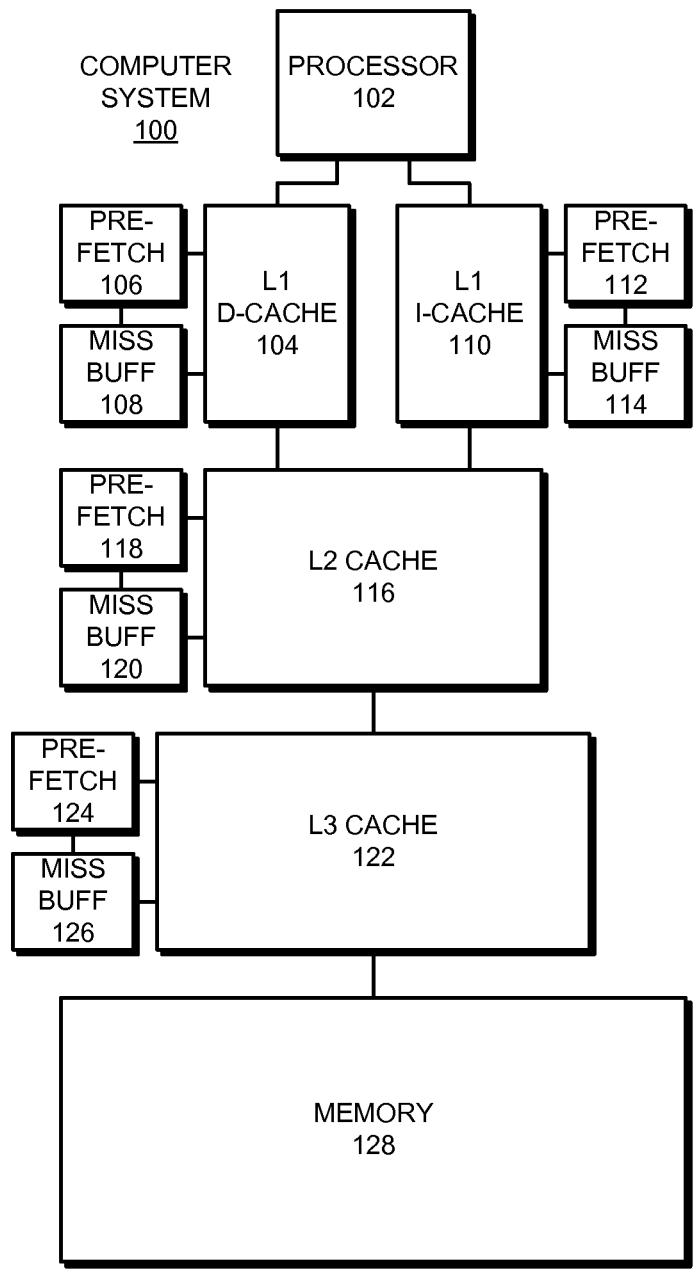
FIG. 1 illustrates a computer system in accordance with the disclosed embodiments.

FIG. 1 illustrates a computer system 100 in accordance with the disclosed embodiments. Computer system 100 can generally include any type of computer system, including, but not limited to, a microprocessor-based computer system, a server, a digital signal processor, a smartphone, a device controller and a computational engine within an appliance. As is illustrated in FIG. 1, computer system 100 includes a processor 102 which is coupled to a memory hierarchy which includes a number of caches (104, 110, 116 and 122) and a main memory 128. Processor 102 can generally include any type of single-core or multi-core processor. In the embodiment illustrated in FIG. 1, processor 102 is connected to a level one (L1) data cache 104 and an L1 instruction cache 110. These L1 caches 104 and 110 are connected to an L2 cache 116, which stores both instructions and data. L2 cache 116 is in turn connected to an L3 cache 122 which is connected to a main memory 128.

As illustrated in FIG. 1, caches 104, 110, 116 and 122 are each associated with miss buffers 108, 114, 120 and 126, respectively. Each of these miss buffers stores new memory requests as well as requests that have caused a cache miss and are waiting for a corresponding cache line to be returned from levels of the memory hierarchy which are more distant from the processor.

Caches 104, 110, 116 and 122 are also associated with prefetching circuitry 106, 112, 118 and 124, respectively. This prefetching circuitry 106, 112, 118 and 124 can generate prefetch requests and can also receive software prefetch requests. This prefetching circuitry 106, 112, 118 and 124 also determines whether to drop prefetch specific requests based on system load.

Prefetch Sources

A typical processor generates prefetches from multiple sources. For example, in a typical processor, prefetches can be generated by: an L1 instruction prefetcher that generates prefetches based on instruction-access patterns; an L1 data stream prefetcher that infers data-access patterns (strides); or an L2 next-line prefetcher which generates prefetches for consecutive cache lines. Prefetches can also be generated by a compiler which outputs explicit software prefetch instructions. In the example above, the cache which is most proximate to the processor that these prefetch sources can install their prefetches into are: the L1 instruction cache, the L1 data cache, the L2 cache, and the L3 data cache, respectively. Note that most memory hierarchies are configured to have the "inclusion property." This means that a cache line which is prefetched into the L1 cache is also prefetched into the L2 and L3 caches.

Figure 2A:
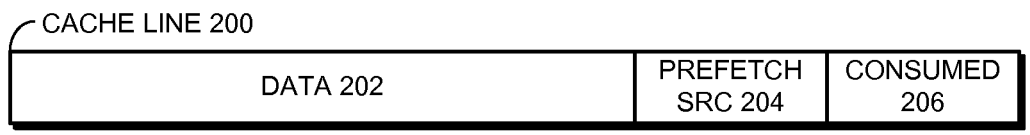
FIG. 2A illustrates a cache line in accordance with the disclosed embodiments.

In the present invention, an accuracy value can be assigned to a prefetch based on the accuracy of its prefetch source. In particular, the accuracy of a prefetch source can be determined as follows. The system includes additional structures in the cache which is most proximate to the processor that a prefetch source installs its prefetches into (e.g, the L1 instruction cache, the L1 data cache, and the L2 cache). More specifically, referring to FIG. 2A, a given cache line 200, which includes a data field 202, can be augmented with two additional fields, namely a "prefetch source" field 204 and a "consumed" field 206. The prefetch source field 204 identifies the prefetch source that generated the prefetch that brought the line into the cache. For example, if the processor has four prefetch sources, the prefetch source field can be 2-bits wide, to encode the four possible prefetch sources. The consumed field 206, which can be implemented using a single bit, can be reset to 0 when the line is first brought into the cache, and can be set to 1 when the line is accessed by a demand request.

Figure 2B:
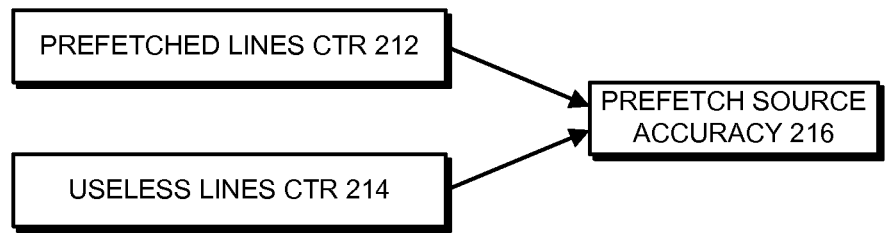
FIG. 2B illustrates information maintained on a cache for each prefetch source in accordance with the disclosed embodiments.

Referring to FIG. 2B, in addition to these additional cache line fields, the system also maintains two counters for each prefetch source, including a "prefetched lines" counter 212 and a "useless lines" counter 214. The prefetched lines counter 212 is incremented whenever a prefetch from that source installs a line into the cache. In contrast, the useless lines counter 214 is incremented whenever a line which was brought into the cache by that prefetch source is evicted and its consumed field is 0, indicating that it was never accessed by a demand request. Both of these counters 212 and 214 are located in the cache which is most proximate to the processor that this prefetch source installs its prefetches into.

The system periodically uses the values in these counters to compute a prefetch source accuracy 216. More specifically, the prefetch source accuracy for a given prefetch source can be computed based on a ratio of its useless lines counter 214 and its prefetched lines counter 212. This accuracy can be defaulted to a moderate default accuracy value when the prefetched lines counter is below a certain threshold. This ensures that the prefetch source accuracy 216 is only used when it is computed based on a minimum number of prefetches. Also, the prefetched lines counter 212 and the useless lines counter 214 are periodically reset to zero, which ensures that accuracy computations are performed using up-to-date information.

In an exemplary embodiment, two bits are used to represent the prefetch source accuracy 216, so the accuracy values can be 0, 1, 2 or 3. Note that the accuracy value of a prefetch source can be communicated to every cache in the system that implements a prefetch-dropping policy, and which is associated with the prefetch source. For example, if the accuracy value is determined at an L1 cache, it can be communicated to corresponding L2 and L3 caches.

The hardware costs involved in implementing this technique are very low. For example, assuming the system has 4 prefetch sources, the overhead per cache line is only 3 bits. This includes 2 bits in the prefetch source field to encode the 4 possible prefetch sources, and 1 bit for the consumed field. Note that an additional bit (or an additional encoded value) may be required to indicate that the cache line is associated with a prefetch. Also, assuming the prefetched lines counter and the useless lines counter are both 8-bits wide, only four pairs of 8-bit counters are needed. Finally, assuming 4 possible accuracy values for each of the 4 prefetch sources, only four 2-bit registers are needed to store the computed accuracy values.

In some embodiments, each cache line is augmented with a "strand" field, which identifies the strand (e.g., process or thread) that brought the line into the cache. In this embodiment, each strand also has its own set of prefetched lines counters and useless lines counters. The strand field in each cache line can used to determine which strand counters to update. An advantage of this embodiment is that a prefetch source is able to determine separate accuracy values for each strand. A disadvantage is that the hardware costs are greater due to the additional bits required per cache line, as well as the additional counters and registers for each thread.

As described above, a different accuracy value can be computed for each prefetch source. In one embodiment, each accuracy value has its own miss buffer occupancy threshold for controlling when prefetch dropping is activated. In the example described above, there are four miss buffer occupancy thresholds corresponding to the four accuracy values for the four different prefetch sources. Note that these occupancy thresholds can be configured via processor configuration registers.

In addition to controlling whether prefetches should be dropped, the accuracy value of a prefetch source can also be used to throttle or disable prefetching from that source. For example, the accuracy value of the L2 next-line prefetcher can be used to enable or disable the prefetcher, which can save power. When a prefetcher is disabled because its accuracy value is low, it can be periodically re-enabled so that its accuracy value can be periodically re-calculated. If the accuracy value is sufficiently high, the prefetcher stays enabled until its accuracy value drops below a pre-defined threshold.

Processing a Prefetched Cache Line

FIG. 3A presents a flow chart illustrating how a prefetched cache line is processed when it is received at a cache in accordance with the disclosed embodiments. First, the system receives a cache line from a lower level of the memory hierarchy in response to a prefetch request from a specific prefetch source (step 302). Next, the system increments the prefetched lines counter for the specific prefetch source (step 304). The system also writes an identifier for the prefetch source into the prefetch source field in the cache line (step 306) and also clears the consumed field (step 308). Finally, the system installs the cache line (including the prefetch source field and the consumed field) into the cache (step 310).

Next, during program execution, when a cache line is ultimately accessed by a demand request, the system sets the consumed field in the cache line (step 312 in FIG. 3B). Also, when a cache line is evicted from the cache, if the cache line is associated with a prefetch request and the consumed field was never set, the system increments the useless lines counter for the prefetch source (step 314 in FIG. 3C).

Computing Accuracy Information

Figure 4:
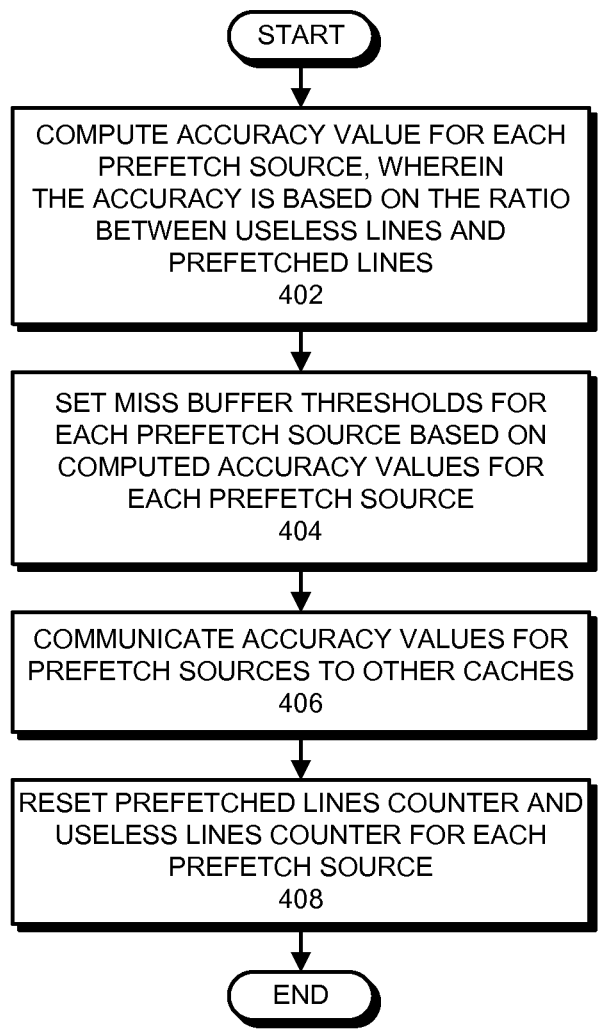
FIG. 4 presents a flow chart illustrating how accuracy information for each prefetch source is computed in accordance with the disclosed embodiments.

FIG. 4 presents a flow chart illustrating how an accuracy value for each prefetch source is periodically computed in accordance with the disclosed embodiments. First, the system determines an accuracy value for each prefetch source based on a ratio between the number of useless lines and the number of prefetched lines (step 402). This accuracy can also be condensed into a 2-bit variable with four possible values as is described above. Next, the system sets miss buffer thresholds for each prefetch source based on the computed accuracy value for each prefetch source (step 404). The system also communicates the accuracy information for the prefetch sources to other related caches that can also make use of this accuracy information to drop prefetches (step 406). Note that although accuracy values are typically determined at the L1 cache level, the accuracy values can be communicated to associated L2 and L3 caches, because prefetches can also be dropped at the L2 and L3 caches. Finally, the system resets the prefetched lines counter and the useless lines counter for each prefetch source (step 408).

Dropping Prefetch Requests

Figure 5A:
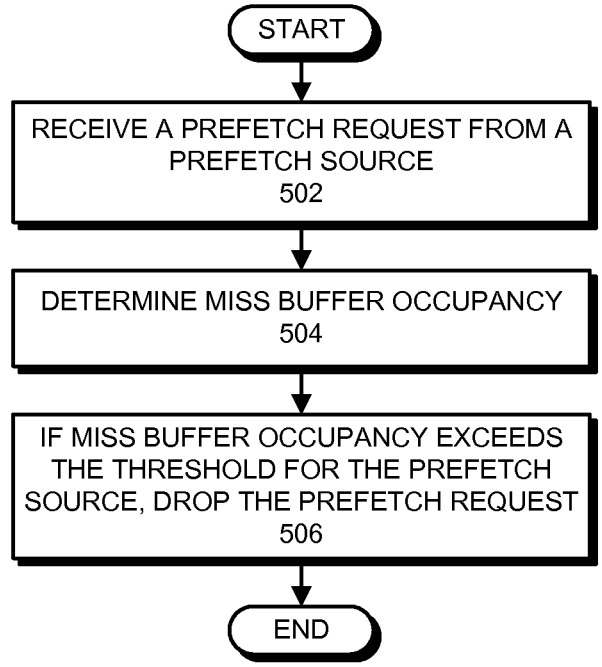
FIG. 5A presents a flow chart illustrating how prefetch requests are dropped based on a miss buffer occupancy threshold in accordance with the disclosed embodiments.

FIG. 5A presents a flow chart illustrating how prefetch requests can be dropped based on a miss buffer occupancy threshold in accordance with the disclosed embodiments. First, the system receives a prefetch request at a cache, wherein the prefetch request is received from a specific prefetch source (step 502). Next, the system determines an occupancy for a miss buffer associated with the cache (step 504). Next, the system drops the prefetch request if the determined occupancy exceeds an occupancy threshold, wherein the occupancy threshold was calculated based on the determined accuracy values (step 506). Note that dropping a prefetch can simply involve not entering the prefetch into the miss buffer.

Figure 5B:
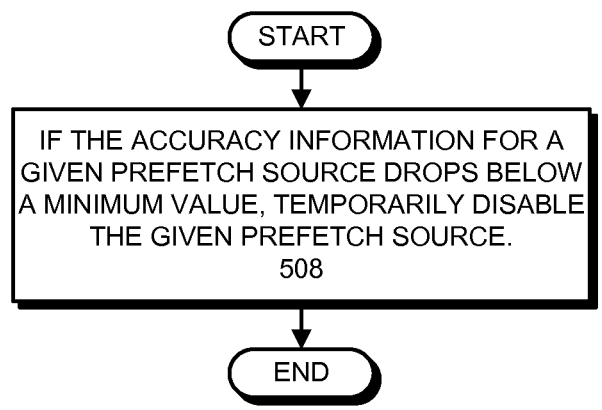
FIG. 5B presents a flow chart illustrating how a prefetch source can be temporarily disabled based on the accuracy information in accordance with the disclosed embodiments.

Also, in some embodiments if the accuracy value for a given prefetch source drops below a minimum value, the system can temporarily disable the prefetch source (step 508 in FIG. 5B). For example, this can involve turning off the circuitry for the prefetch source to save power.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for selectively dropping a prefetch request at a cache, comprising:
   receiving the prefetch request at the cache; and using accuracy information for previous prefetch requests associated with the cache to determine whether to drop the prefetch request, wherein the accuracy information is associated with different prefetch sources, and wherein determining whether to drop the prefetch request comprises:
  identifying a prefetch source for the prefetch request; and
  using accuracy information for the identified prefetch source to determine whether to drop the prefetch request.

2. The method of claim 1, wherein if the accuracy information for a given prefetch source drops below a minimum value, the method further comprises temporarily disabling the given prefetch source.

3. The method of claim 1, wherein the different prefetch sources can include one or more of the following:
  a software prefetcher that generates software prefetch instructions;
  a stride-based hardware prefetcher that generates prefetches by inferring strides for an associated data stream; and
  a next-line hardware prefetcher that generates prefetches for consecutive cache lines.

4. The method of claim 3, wherein the different prefetch sources can be associated with different levels of cache memory.

5. The method of claim 1, wherein determining whether to drop the prefetch request involves:
  determining an occupancy for a miss buffer associated with the cache; and
  determining that the prefetch request should be dropped if the determined occupancy exceeds an occupancy threshold, wherein the occupancy threshold was calculated based on the measured accuracy information.

6. The method of claim 5, wherein different occupancy thresholds can exist for different prefetch sources.

7. The method of claim 1, wherein prior to receiving the prefetch request, the method further comprises determining the accuracy information at a given cache by performing the following operations for each prefetch source:
  measuring a number of prefetched lines which were prefetched into the given cache for the prefetch source;
  measuring a number of useless lines, which were prefetched into the given cache for the prefetch source, but were not accessed by a demand request prior to being evicted from the given cache; and
  determining an accuracy for the prefetch source based on a ratio between the number of useless lines and the number of prefetched lines.

8. The method of claim 7, wherein after determining the accuracy information, the method further comprises communicating the determined accuracy information to other caches which are associated with the given cache.

9. A system that selectively drops prefetch requests, comprising:
  a processor;
  a cache attached to the processor; and
  a prefetch-handling mechanism associated with the cache, wherein the prefetch-handling mechanism is configured to:
    receive a prefetch request, and
    use accuracy information for previous prefetch requests associated with the cache to determine whether to drop the prefetch request, wherein the accuracy information is associated with different prefetch sources, and wherein, while determining whether to drop the prefetch request, the prefetch-handling mechanism is configured to:
      identify a prefetch source for the prefetch request; and
      use accuracy information for the identified prefetch source to determine whether to drop the prefetch request.

10. The system of claim 9, wherein if the accuracy information for a given prefetch source drops below a minimum value, the system is configured to temporarily disable the given prefetch source.

11. The system of claim 9, wherein while determining whether to drop the prefetch request, the prefetch-handling mechanism is configured to:
  determine an occupancy for a miss buffer associated with the cache; and
  determine that the prefetch request should be dropped if the determined occupancy exceeds an occupancy threshold, wherein the occupancy threshold was calculated based on the measured accuracy information.

12. The system of claim 11, wherein different occupancy thresholds can exist for different prefetch sources.

13. The system of claim 9, wherein the different prefetch sources can include one or more of the following:
  a software prefetcher that generates software prefetch instructions;
  a stride-based hardware prefetcher that generates prefetches by inferring strides for an associated data stream; and
  a next-line hardware prefetcher that generates prefetches for consecutive cache lines.

14. The system of claim 13, wherein the different prefetch sources can be associated with different levels of cache memory.

15. The system of claim 9, wherein prior to receiving the prefetch request, the prefetch-handling mechanism is configured to determine the accuracy information at a given cache by performing the following operations for each prefetch source:
  measuring a number of prefetched lines which were prefetched into the given cache for the prefetch source;
  measuring a number of useless lines, which were prefetched into the given cache for the prefetch source, but were not accessed by a demand request prior to being evicted from the given cache; and
  determining an accuracy for the prefetch source based on a ratio between the number of useless lines and the number of prefetched lines.

16. The system of claim 15, wherein after determining the accuracy information, the prefetch-handling mechanism is configured to communicate the determined accuracy information to other caches which are associated with the given cache.

17. The system of claim 15, wherein each cache line in the given cache can include:
  a source field indicating whether the cache line is associated with a prefetch and identifying an associated prefetch source;
  a consumed field indicating whether the cache line has been accessed by a demand request; and
  a strand field identifying the strand that generated the prefetch for the cache line.

18. The system of claim 15, wherein the given cache includes:
  a prefetched lines counter for each prefetch source indicating a number of prefetched lines which were prefetched into the given cache for the prefetch source; and a useless lines counter for each prefetch source indicating a number of useless lines, which were prefetched into the given cache for the prefetch source but were not accessed by a demand request prior to being evicted from the given cache.

* * * * *